United States Patent
Dolan et al.

(10) Patent No.: US 12,492,156 B2
(45) Date of Patent: Dec. 9, 2025

(54) HYDROCARBON RECOVERY UNIT WITH RECYCLE LOOP FOR ADSORBENT BED REGENERATION

(71) Applicant: BASF CORPORATION, Florham Park, NJ (US)

(72) Inventors: William B. Dolan, Iselin, NJ (US); Justin Pan, Iselin, NJ (US)

(73) Assignee: BASF Corporation, Florham Park, NJ (US)

(*) Notice: Subject to any disclaimer, the term of this patent is extended or adjusted under 35 U.S.C. 154(b) by 125 days.

(21) Appl. No.: 18/265,873

(22) PCT Filed: Dec. 12, 2021

(86) PCT No.: PCT/US2021/062991
§ 371 (c)(1),
(2) Date: Jun. 7, 2023

(87) PCT Pub. No.: WO2022/132602
PCT Pub. Date: Jun. 23, 2022

(65) Prior Publication Data
US 2024/0059634 A1    Feb. 22, 2024

Related U.S. Application Data

(60) Provisional application No. 63/127,876, filed on Dec. 18, 2020.

(51) Int. Cl.
*C07C 7/13* (2006.01)
*B01D 53/04* (2006.01)
(Continued)

(52) U.S. Cl.
CPC ............ *C07C 7/13* (2013.01); *B01D 53/0423* (2013.01); *B01D 53/1487* (2013.01);
(Continued)

(58) Field of Classification Search
None
See application file for complete search history.

(56) References Cited

U.S. PATENT DOCUMENTS 5,248,488 A * 9/1993 Yan .......................... C07C 7/13
                                                95/902
7,311,758 B2   12/2007 Thomas et al.
(Continued)

FOREIGN PATENT DOCUMENTS

| WO | 2012/161826 A1 | 11/2012 |
| WO | 2014/031267 A1 | 2/2014 |
| WO | 2021/263216 A1 | 12/2021 |

OTHER PUBLICATIONS

International Search Report and Written Opinion of of International Application No. PCT/US2021/062991 dated Mar. 2, 2022, 7 pgs.
(Continued)

*Primary Examiner* — Tam M Nguyen
(74) *Attorney, Agent, or Firm* — Peter DiMauro

(57) ABSTRACT

Disclosed in certain embodiments are processes for heavy hydrocarbon removal that implement a regeneration loop that introduces an absorbent into a regeneration gas stream, and systems for implementing the same.

11 Claims, 6 Drawing Sheets

(51) Int. Cl.
  *B01D 53/14* (2006.01)
  *B01J 20/18* (2006.01)
  *C07C 7/12* (2006.01)
  *C10L 3/10* (2006.01)

(52) U.S. Cl.
  CPC ............. *B01J 20/186* (2013.01); *C10L 3/103* (2013.01); *B01D 2252/2026* (2013.01); *B01D 2253/108* (2013.01); *B01D 2257/306* (2013.01); *B01D 2257/702* (2013.01); *B01D 2259/40086* (2013.01); *C10L 2290/12* (2013.01); *C10L 2290/542* (2013.01)

(56) References Cited

U.S. PATENT DOCUMENTS

| | | | |
|---|---|---|---|
| 11,260,337 B2* | 3/2022 | Griffiths | C10G 25/003 |
| 2005/0109206 A1 | 5/2005 | Thomas et al. | |
| 2006/0204419 A1 | 9/2006 | Thomas et al. | |
| 2007/0006732 A1* | 1/2007 | Mitariten | B01D 53/1462 95/237 |
| 2007/0193925 A1 | 8/2007 | Briot et al. | |
| 2009/0320679 A1* | 12/2009 | Baksh | B01D 53/0462 96/112 |
| 2013/0192299 A1* | 8/2013 | Dolan | C10G 5/02 62/636 |
| 2014/0033763 A1 | 2/2014 | Chen et al. | |
| 2014/0363360 A1 | 12/2014 | Iyer | |
| 2016/0214058 A1 | 7/2016 | Westendorf et al. | |
| 2016/0236140 A1 | 8/2016 | Northrop et al. | |
| 2018/0056229 A1* | 3/2018 | Denton | B01D 15/161 |
| 2018/0071674 A1* | 3/2018 | Freeman | B01D 53/1475 |
| 2018/0311609 A1* | 11/2018 | McCool | G05B 19/401 |
| 2018/0339263 A1* | 11/2018 | Dehaas | B01D 53/04 |
| 2019/0388828 A1 | 12/2019 | Shain-Jer | |
| 2021/0069638 A1* | 3/2021 | Philbrook | B01D 53/1406 |
| 2021/0339187 A1 | 11/2021 | Dolan et al. | |

OTHER PUBLICATIONS

Extended EP Search Report dated Nov. 26, 2024.

* cited by examiner

HYDROCARBON RECOVERY UNIT WITH RECYCLE LOOP FOR ADSORBENT BED REGENERATION

CROSS-REFERENCE TO RELATED APPLICATION(S)

This application claims the benefit of priority of U.S. Provisional Patent Application No. 63/127,876, filed on Dec. 18, 2020, the disclosure of which is hereby incorporated by reference herein in its entirety.

BACKGROUND

Hydrocarbon recovery units (HRUs) generally utilize one or more adsorbent beds during hydrocarbon adsorption, while at the same time one or more adsorbent beds are regenerated via a regeneration loop. The regeneration loop utilizes a heating step followed by a cooling step with the gas feed stream or a treated gas stream being used as the regeneration gas. Contaminants are subsequently removed as liquids from the regeneration gas during cooling via a condenser while the separated regeneration gas is recycled to the feed side of the one or more beds in adsorption and mixed with the feed gas. The regeneration process can be adjusted for specific adsorbent mass and cycle time such that one or more contaminants is preferentially removed. However, if certain contaminants, such as mercaptans, are not adequately removed by the separation, excess contaminants can be reintroduced into the feed gas, thus resulting in a higher concentration of contaminants at the feed side of the one or more adsorbent beds.

SUMMARY

The following summary presents a simplified summary of various aspects of the present disclosure in order to provide a basic understanding of such aspects. This summary is not an extensive overview of the disclosure. It is intended to neither identify key or critical elements of the disclosure, nor delineate any scope of the particular embodiments of the disclosure or any scope of the claims. Its sole purpose is to present some concepts of the disclosure in a simplified form as a prelude to the more detailed description that is presented later.

In one aspect of the present disclosure, a process comprises: introducing a gas feed stream comprising C5+ hydrocarbons or organic sulfur species into a first adsorbent bed to produce a treated gas stream; regenerating a second adsorbent bed with a portion of the treated gas stream to produce a regeneration gas stream; introducing an absorbent into the regeneration gas stream to remove a portion of the C5+ hydrocarbons or organic sulfur species; subsequently removing the portion of the C5+ hydrocarbons or organic sulfur species from the regeneration gas stream; and subsequently mixing the regeneration gas stream with the gas feed stream.

In at least one embodiment, the C5+ hydrocarbons or organic sulfur species comprise mercaptans.

In at least one embodiment, the process further comprises cooling the regeneration gas stream to less than 50° C. after introducing the absorbent.

In at least one embodiment, the absorbent comprises C7+ hydrocarbons. In at least one embodiment, the C7+ hydrocarbons correspond to C7+ hydrocarbons that were removed from the regeneration stream.

In at least one embodiment, the absorbent comprises one or more of polyethylene glycol, alkanes, or aromatics.

In at least one embodiment, subsequently removing the portion of the C5+ hydrocarbons or organic sulfur species comprises utilizing three-phase separation to separate the absorbent and liquid water from the regeneration gas stream.

In at least one embodiment, the separated absorbent comprises the portion of the C5+ hydrocarbons or organic sulfur species. In at least one embodiment, the process further comprises: flash evaporating the separated absorbent to remove the portion of the C5+ hydrocarbons or organic sulfur species; and subsequently re-introducing the absorbent into the regeneration gas stream.

In at least one embodiment, one or more of the first adsorbent bed or the second adsorbent bed comprises an amorphous silica adsorbent and/or an amorphous silica-alumina adsorbent, high-silica zeolite, zeolite X, zeolite 5A, or a combination thereof.

In at least one embodiment, one or more of the first adsorbent bed or the second adsorbent bed comprises a zeolite comprising zeolite 3A, zeolite 4A, zeolite 5A, or zeolite 13X, or a combination thereof. In at least one embodiment, the zeolite is exchanged with an element selected from Li, Na, K, Mg, Ca, Sr, or Ba.

In another aspect of the present disclosure, an adsorption system comprises: a feed gas inlet; a first adsorbent bed fluidly coupled to the feed gas inlet to receive a gas feed stream comprising C5+ hydrocarbons or organic sulfur species; and a regeneration loop fluidly coupled to the first adsorbent bed. In at least one embodiment, the regeneration loop comprises: a second adsorbent bed configured to receive a treated gas stream from the first adsorbent bed; an absorbent flow path configured to introduce an absorbent into a regeneration gas stream from the second adsorbent bed to remove at least a portion of the C5+ or organic sulfur species from the regeneration gas stream; and a separator fluidly coupled to the first adsorbent bed configured to separate the absorbent from the regeneration gas stream prior to mixing with the gas feed stream.

In at least one embodiment, the regeneration loop comprises a cooler downstream from the second adsorbent bed and upstream from the separator configured to cool the regeneration gas and the absorbent.

In at least one embodiment, the separator is a three-phase separator configured to separate the absorbent and liquid water from the regeneration gas stream.

In at least one embodiment, the adsorption system further comprises a heater downstream from the separator to heat the absorbent and remove absorbed C5+ hydrocarbons or organic sulfur species.

In at least one embodiment, one or more of the first adsorbent bed or the second adsorbent bed comprises an amorphous silica adsorbent and/or an amorphous silica-alumina adsorbent.

In at least one embodiment, one or more of the first adsorbent bed or the second adsorbent bed comprises an amorphous silica adsorbent and/or an amorphous silica-alumina adsorbent, high-silica zeolite, zeolite X, zeolite 5A, or a combination thereof.

In at least one embodiment, one or more of the first adsorbent bed or the second adsorbent bed comprises a zeolite comprising zeolite 3A, zeolite 4A, zeolite 5A, or zeolite 13X, or a combination thereof. In at least one embodiment, the zeolite is exchanged with an element selected from Li, Na, K, Mg, Ca, Sr, or Ba.

In another aspect of the present disclosure, a natural gas purification system comprises any of the aforementioned adsorbent systems.

BRIEF DESCRIPTION OF THE DRAWINGS

The present disclosure is illustrated by way of example, and not by way of limitation, in the figures of the accompanying drawings, in which.

DETAILED DESCRIPTION

Figure 1:
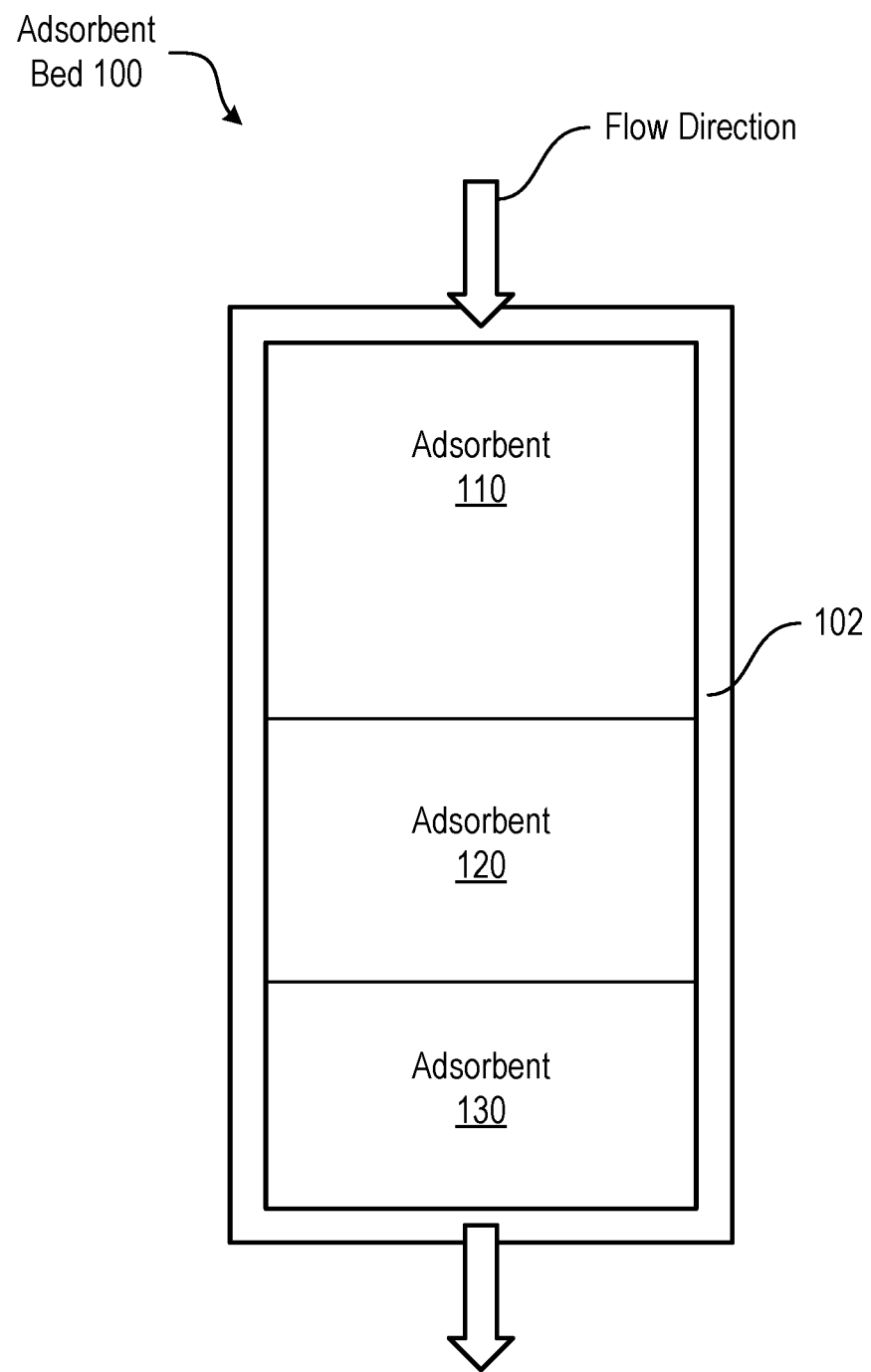
FIG. 1 illustrates an adsorbent bed for use in accordance with at least one embodiment of the disclosure.

The present disclosure relates generally to systems and processes for heavy hydrocarbon removal. Specifically, certain embodiments include a regeneration loop that introduces an absorbent into a regeneration gas stream to adsorb, for example, C5+ hydrocarbons (e.g., n-heptane) and/or mercaptans. The embodiments described herein advantageously reduce the amount of build-up of heavy hydrocarbons and mercaptans from a gas stream of the regeneration loop when re-introduced into an adsorbent bed together with a gas feed stream during an adsorption cycle.

The adsorption process of the present disclosure, used to remove mercaptans, heavy hydrocarbons (e.g., C5+ or C6+ components), and/or water from gas feed streams (e.g., a natural gas feed streams), may be accomplished by thermal swing adsorption (TSA). TSA processes are generally known in the art for various types of adsorptive separations. Generally, TSA processes utilize the process steps of adsorption at a low temperature, regeneration at an elevated temperature with a hot purge gas, and a subsequent cooling down to the adsorption temperature. TSA processes are often used for drying gases and liquids and for purification where trace impurities are to be removed. TSA processes are often employed when the components to be adsorbed are strongly adsorbed on the adsorbent, and thus heat is required for regeneration. A typical TSA process includes adsorption cycles and regeneration (desorption) cycles, each of which may include multiple adsorption steps and regeneration steps, as well as cooling steps and heating steps. The regeneration temperature is higher than the adsorption temperature in order to effect desorption of water, mercaptans, and heavy hydrocarbons.

In the regeneration step, part of one of the gas streams (e.g., a stream of natural gas), the product effluent from the adsorption unit, or a waste stream from a downstream process can be heated, and the heated stream is circulated through the adsorbent to desorb the adsorbed components. In some embodiments, it is advantageous to employ a hot purge stream comprising a heated raw natural gas stream for regeneration of the adsorbent.

In some embodiments, the pressures used during the adsorption and regeneration steps are generally elevated at typically 700 to 1500 psig. Typically, heavy hydrocarbon adsorption is carried out at pressures close to that of the feed stream and the regeneration steps may be conducted at about the adsorption pressure or at a reduced pressure. When a portion of an adsorption effluent stream is used as a purge gas, the regeneration may be advantageously conducted at about the adsorption pressure, especially when the waste or purge stream is re-introduced into the raw natural gas stream, for example.

As used herein, a "mercaptan" refers to an organic sulfur-containing compound including, but not limited to, methyl mercaptans (C1-RSH), ethyl mercaptans (C2-RSH), propyl mercaptans (C3-RSH), butyl mercaptans (C4-RSH), dimethyl sulfide (DMS), and dimethyl disulfide (DMDS).

While embodiments of the present disclosure are described with respect to natural gas purification processes, it is to be understood by those of ordinary skill in the art that the embodiments herein may be utilized in or adapted for use in other types of industrial applications that require hydrocarbon removal.

FIG. 1 illustrates an adsorbent bed 100 in accordance with a first embodiment of the disclosure, which may be adapted for use in a TSA process. The adsorbent bed 100 includes an adsorbent layer 110, an adsorbent layer 120, and an adsorbent layer 130 each contained inside a vessel 102. The three adsorbents are merely illustrative, and it is to be understood that any suitable number of distinct adsorbent layers may be utilized (e.g., a single layer, two layers, etc.). The flow direction indicates the flow of a gas feed stream through an inlet of the vessel 102, through the adsorbent layer 110, through the adsorbent layer 120, and then through adsorbent layer 130 before reaching an outlet of the vessel 102. The adsorbent layer 120 is said to be downstream from the adsorbent layer 110 based on this flow direction. Similarly, the adsorbent 130 is said to be downstream from the adsorbent layer 120. In some embodiments, each adsorbent layer may comprise their respective adsorbents in a form of adsorbent beads having diameters, for example, from about 1 mm to about 5 mm. The relative sizes of the adsorbent layers is not necessarily drawn to scale, though in certain embodiments a weight percent (wt. %) of the adsorbent layer 110 with respect to a total weight of the adsorbent bed 100 (i.e., a total weight of the adsorbent layer 110, the adsorbent layer 120, and the adsorbent layer 130) may be greater than 50 wt. %, greater than 60 wt. %, greater than 70 wt. %, greater than 80 wt. %, or greater than 90 wt. %.

In some embodiments, one or more of the adsorbent layers 110, 120, or 130 comprise an adsorbent that is preferentially selective for C5+ or C6+ hydrocarbons. In some embodiments, one or more of the adsorbent layers 110, 120, or 130 comprise an adsorbent that is preferentially selective for mercaptans. As used herein, the terms "preferentially selective for" or "selective for" indicates that the adsorbent adsorbs the specified compound at a greater equilibrium loading compared to methane, further described by the following equation: selectivity=(loading C6+/concentration C6+)/(loading C1/concentration C1), where C1 is methane, and where loading is defined as moles of component adsorbed/gram of adsorbent. In certain embodiments, C5+ or C6+ compounds may comprise one or more of pentane, hexane, benzene, heptane, octane, nonane, toluene, ethylbenzene, xylene, or neopentane.

In some embodiments, one or more of the adsorbent layers 110, 120, or 130 comprise one or more of an amorphous silica adsorbent, an amorphous silica-alumina adsorbent, or a high-silica zeolite adsorbent. In some embodiments, one or more of the adsorbent layers 110, 120, or 130 comprise an amorphous silica adsorbent and/or an amorphous silica-alumina adsorbent. Amorphous silica adsorbents and amorphous silica-alumina adsorbents may be at least partially crystalline. In some embodiments, an amorphous silica adsorbents or an amorphous silica-alumina adsorbent may be at least 50% amorphous, at least 60% amorphous, at least 70% amorphous, at least 80% amorphous, at least 90% amorphous, or 100% amorphous. In some embodiments, an amorphous silica adsorbents or an amorphous silica-alumina adsorbent may further include other components, such as charge-balancing cations. In some embodiments, one or more of the adsorbent layers 110, 120, or 130 comprise a high-silica zeolite adsorbent, such as beta zeolite, ZSM-5, Y zeolite, or combinations thereof. As used herein, "high-silica zeolite" refers to a material having a silica-to-alumina ratio, on a molar basis, of at least 5, of at least 10, of at least 20, at least 30, at least 50, at least 100, at least 150, at least 200, at least 250, at least 300, at least 350, at least 400, at least 450, or at least 500. In some embodiments, the silica to alumina ratio is in the range of from 20 to 500.

In some embodiments, the one or more of the adsorbent layers 110, 120, or 130 comprise one or more of zeolite A, zeolite X (e.g., zeolite 13X, which is zeolite X that has been exchanged with sodium ions), or zeolite Y. In some embodiments, one or more of the adsorbent layers 110, 120, or 130 comprise one or more of zeolite 3A, zeolite 4A, zeolite 5A, or zeolite X. In some embodiments, the zeolite is exchanged with any element of columns I and II of the periodic table, such as Li, Na, K, Mg, Ca, Sr, or Ba. In some embodiments, one or more of the adsorbent layers 110, 120, or 130 comprise one or more of zeolite 5A or zeolite X. In some embodiments, the zeolite is exchanged with any element of columns I and II of the periodic table, such as Li, Na, K, Mg, Ca, Sr, or Ba. In some embodiments, the adsorbent layer 130 comprises zeolite X, and the zeolite X is zeolite 13X (i.e., zeolite X that has been exchanged with sodium ions).

Exemplary adsorbents for one or more of the adsorbent layers 110, 120, or 130 may include one or more of Durasorb™ HD, Durasorb™ BTX, Durasorb™ HC, Durasorb™ AR, or Durasorb™ HR4 (available from BASF).

Figure 2A:
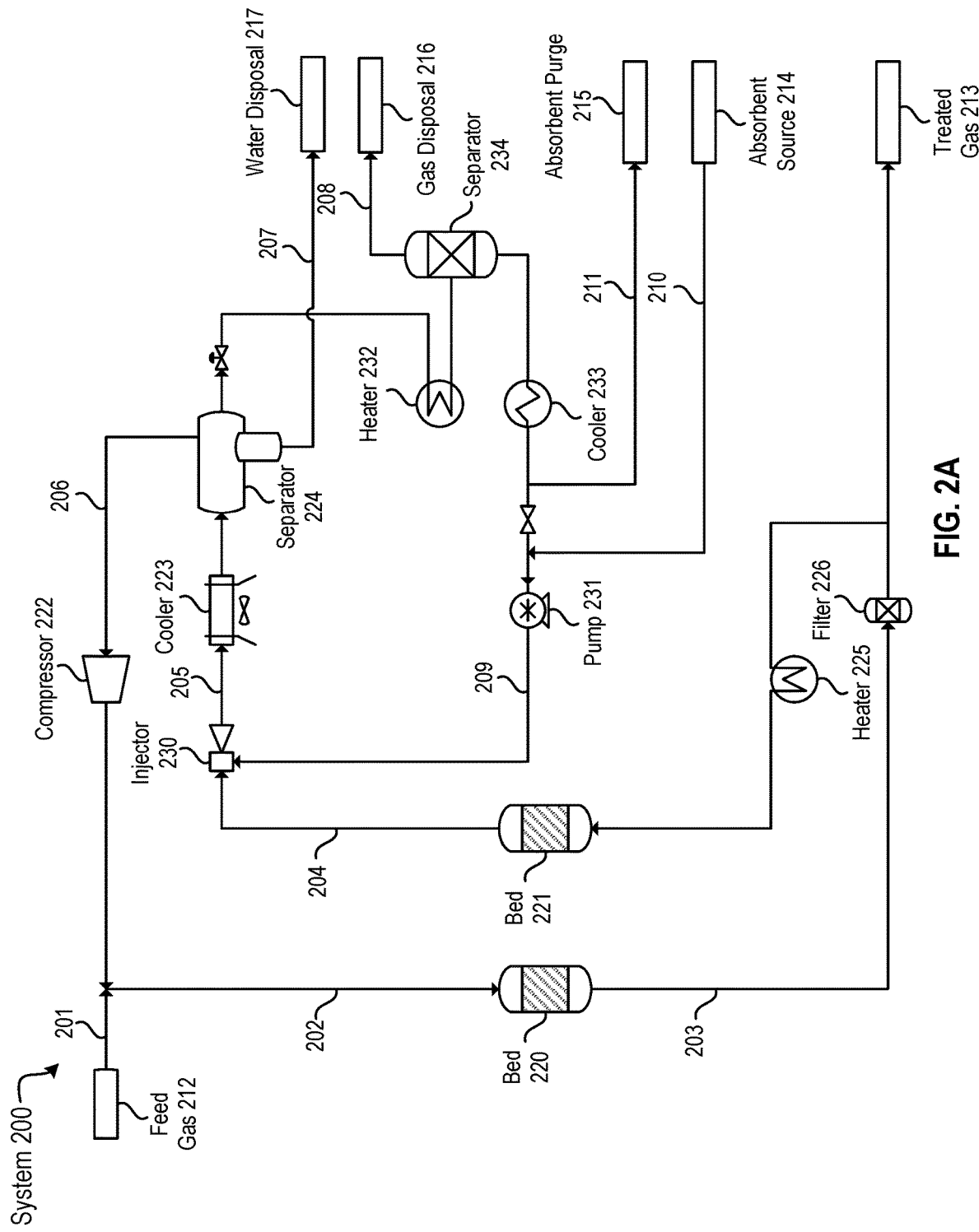
FIG. 2A illustrates a schematic of an illustrative system for hydrocarbon removal in accordance with a first embodiment of the disclosure.

FIG. 2A illustrates a schematic of an illustrative system 200 for hydrocarbon removal in accordance with an embodiment of the disclosure. The system 200 includes a feed gas 212 source to direct a feed gas (e.g., a natural gas) along a stream 201. A stream 202 is directed to an adsorbent bed 220, for example, during an adsorption cycle of a TSA process. In some embodiments, a gas composition of stream 202 corresponds to the gas composition of stream 201. In some embodiments, the gas composition of stream 202 corresponds to a mixture of stream 201 and stream 206, which is a regeneration gas stream described in more detail below.

In some embodiments, a stream 203 leaving the adsorbent bed passes through a filter 226 (e.g., a dust filter) and is split into two paths: a first path to collect treated gas 213 and a second path that uses a portion of treated gas 213 as part of a regeneration loop. The second path may pass through a heater 225 to heat the treated gas to facilitate desorption in an adsorbent bed 221. A regeneration gas stream 204 leaving the adsorbent bed 221 is then directed along a stream 205 to a cooler 223 to facilitate condensation of water and C5+ hydrocarbons.

In some embodiments, an absorbent (e.g., a liquid comprising C7+ hydrocarbons, polyethylene glycol, etc.) from a stream 209 (which may be a liquid transport line) is injected into the regeneration gas stream 204 via an injector 230. The absorbent may be pumped via a pump 231 from an absorbent source 214 along stream 210. In some embodiments, the injector 230 comprises an injection point followed by a static mixer (which may be immediately downstream from the injection point and before the cooler 223. The static mixer can provide a method to mix gases and liquids. A suitable static mixer can include, for example, the SMV™ static mixer (available from SULZER).

In some embodiments, the separator 224 is a three-phase separator adapted to separate the components of stream 205 into a gas phase (stream 206), a liquid water phase (stream 207), and a liquid absorbent phase. The liquid absorbent phase is passed through a heater 232 prior to reaching a separator 234. The heater 232 and separator 234 can be utilized to flash evaporate C5+ and organic sulfur species (e.g., mercaptans) contained in the absorbent to separate the absorbent from a gaseous stream 208 of C5+ and organic sulfur species (which are removed via gas disposal 216). The separated absorbent may be recycled as part of stream 209 by mixing with stream 210 after passing through a cooler 233. In some embodiments, stream 211 is used to remove absorbent (e.g., absorbent purge 215).

Water removed by the separator 224 is transmitted along stream 207 for disposal (e.g., water disposal 217), while the separated regeneration gas stream 206 passes through a compressor 222 prior to being re-introduced into the adsorbent bed 220 via stream 202.

Figure 2B:
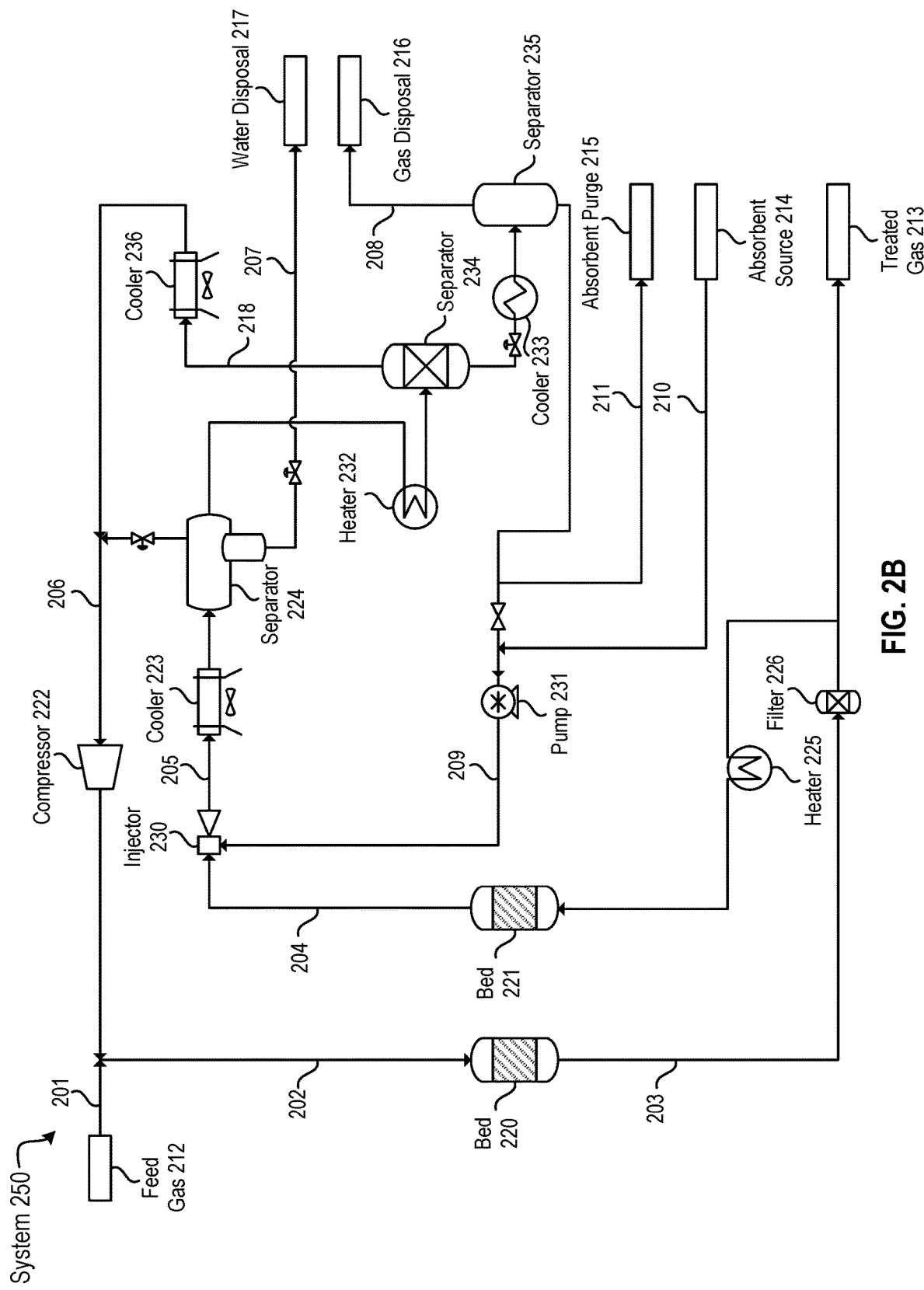
FIG. 2B illustrates a schematic of an illustrative system for hydrocarbon removal in accordance with a second embodiment of the disclosure.

FIG. 2B illustrates a schematic of an illustrative system 250 for hydrocarbon removal in accordance with an embodiment of the disclosure, which is a variation of the system 200. The recycle loop of system 250 differs from system 200 in that after absorbent separated by the separator 224 is sent to the separator 234, a gaseous phase of a stream 218 is then cooled by a cooler 236 prior to mixing with the regeneration gas stream 206. The liquid phase of the separator 234 is then cooled by a cooler 233 and sent to a separator 235 to separate C5+ and organic sulfur species from the absorbent.

Figure 2C:
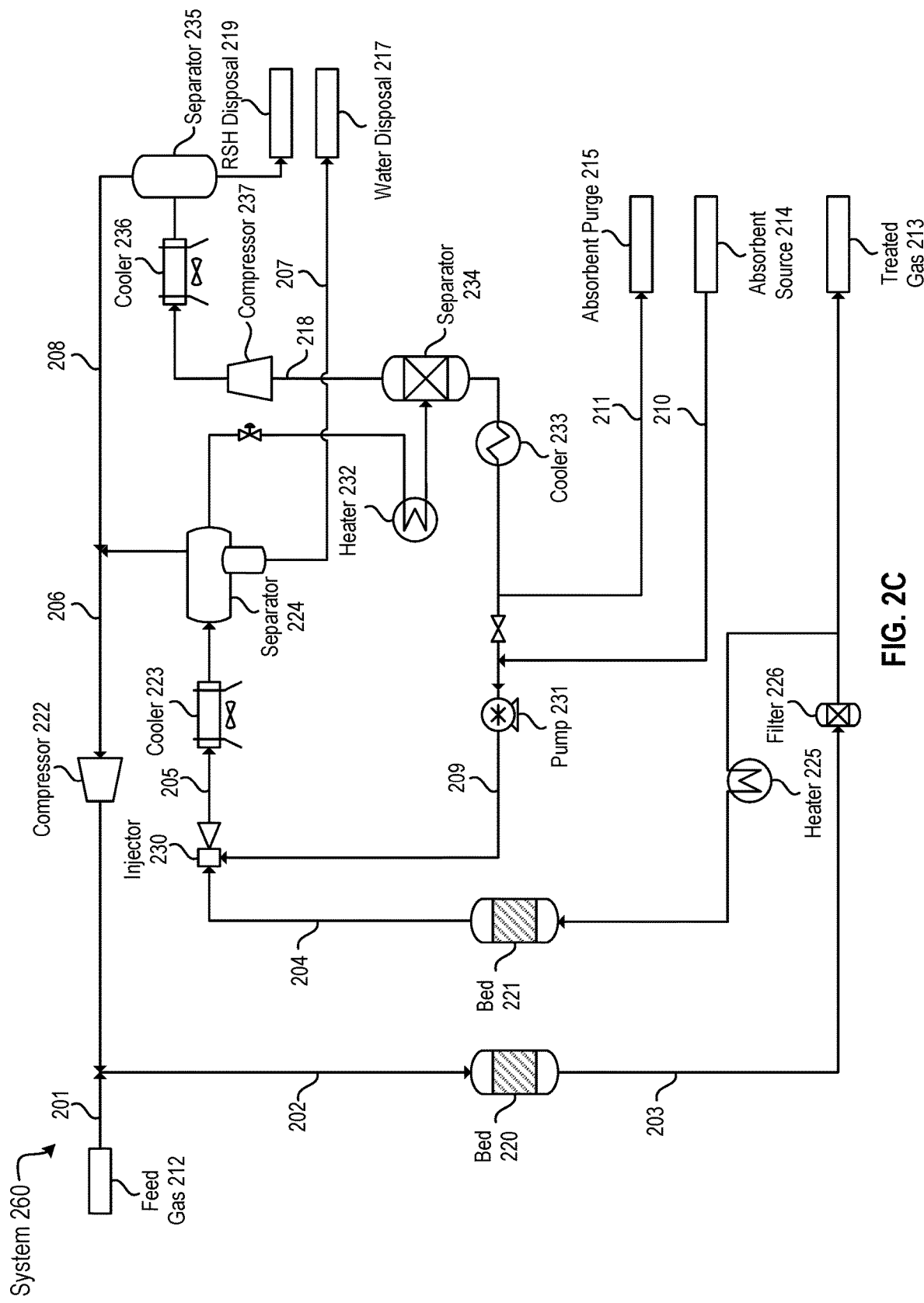
FIG. 2C illustrates a schematic of an illustrative system for hydrocarbon removal in accordance with a third embodiment of the disclosure.

FIG. 2C illustrates a schematic of an illustrative system 260 for hydrocarbon removal in accordance with an embodiment of the disclosure, which is a further variation of system 200. The recycle loop of system 260 differs from system 200 in that after absorbent separated by the separator 224 is sent to the separator 234, a gaseous phase of a stream 218 is compressed via a compressor 237 and cooled by a cooler 236 prior to reaching the separator 235. In some embodiments, the separator 235 removes mercaptans (e.g., mercaptan disposal 219) and a gaseous phase of stream 208 is mixed with the regeneration gas stream 206.

Figure 3:
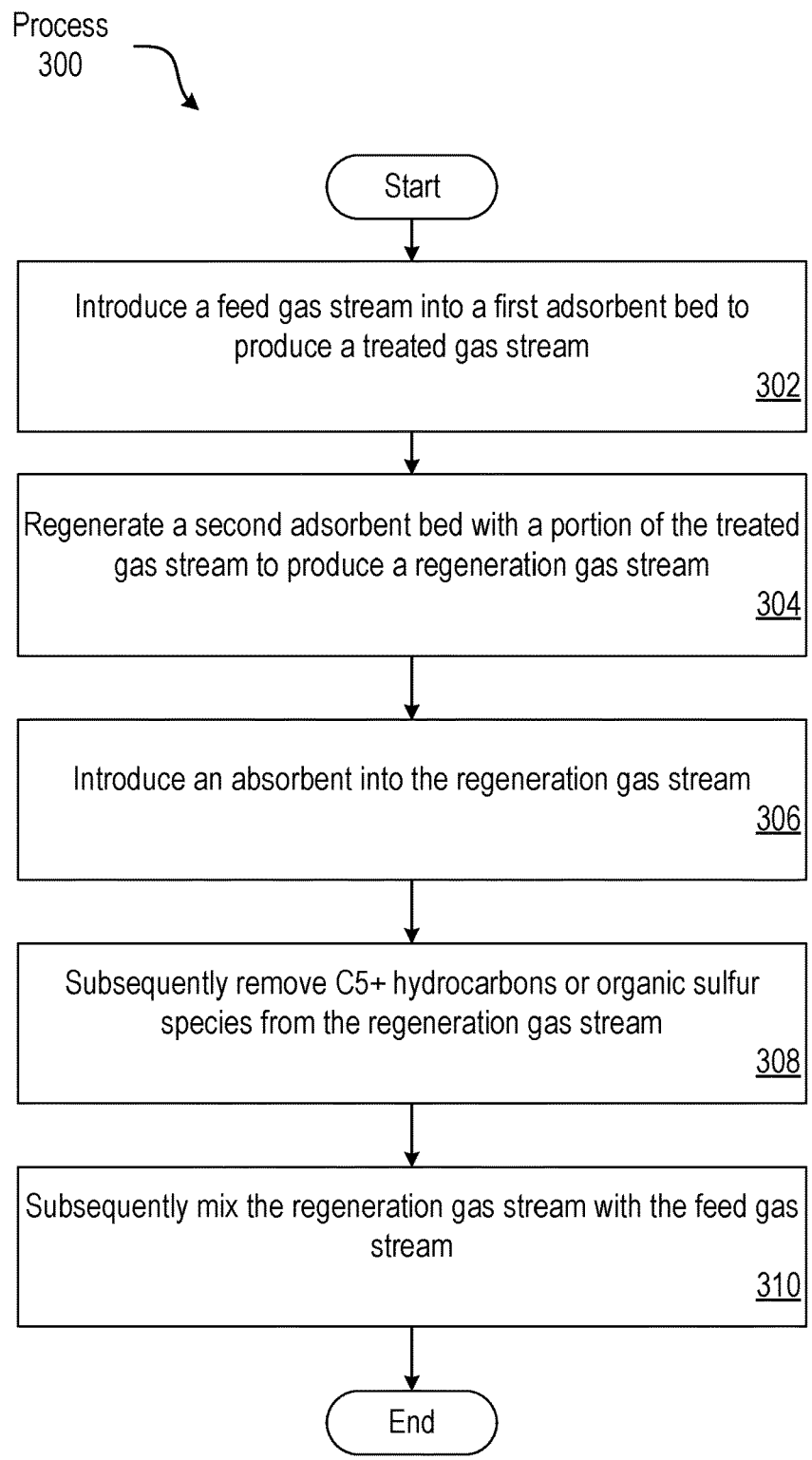
FIG. 3 illustrates a process of regeneration in a system for hydrocarbon removal in accordance with at least one embodiment.

FIG. 3 illustrates a process 300 of regeneration in an HRU system in accordance with at least one embodiment. At block 302, a gas feed stream is introduced into a first adsorbent bed (e.g., adsorbent bed 100 or 220) to produce a treated gas stream. In some embodiments, the adsorbent bed comprises one or more adsorbent layers, such as one or more of adsorbent layers 110, 120, or 130. In some embodiments, the first adsorbent bed comprises an amorphous silica adsorbent and/or an amorphous silica-alumina adsorbent, high-silica zeolite, zeolite X, zeolite 5A, or a combination thereof. In some embodiments, the first adsorbent bed comprises a zeolite comprising zeolite 3A, zeolite 4A, zeolite 5A, or zeolite 13X, or a combination thereof. In some embodiments, the zeolite is exchanged with an element selected from Li, Na, K, Mg, Ca, Sr, or Ba.

In some embodiments, the gas feed stream comprises C5+ hydrocarbons or organic sulfur species (e.g., mercaptans). In some embodiments, the gas feed stream (e.g., stream 201) comprises a natural gas feed stream (e.g., feed gas 212). In some embodiments, the gas feed stream 201 is mixed with a regeneration gas stream (e.g., stream 206) prior to being introduced into the first adsorbent bed (e.g., as stream 202).

In some embodiments, the feed stream is introduced into the first adsorbent bed as part of a TSA process. The TSA process may have an adsorption cycle time of less or equal to about 8 hours, about 7 hours, about 6 hours, about 5 hours, about 4 hours, about 3 hours, about 2 hours, or about 1 hour.

At block 304, a second adsorbent bed (e.g., adsorbent bed 100 or 221) is regenerated with a portion of the treated gas stream (e.g., stream 203) to produce a regeneration gas stream (e.g., stream 204). In some embodiments, the adsorbent bed comprises one or more adsorbent layers, such as one or more of adsorbent layers 110, 120, or 130. In some embodiments, the second adsorbent bed comprises an amorphous silica adsorbent and/or an amorphous silica-alumina adsorbent, high-silica zeolite, zeolite X, zeolite 5A, or a combination thereof. In some embodiments, the second adsorbent bed comprises a zeolite comprising zeolite 3A, zeolite 4A, zeolite 5A, or zeolite 13X, or a combination thereof. In some embodiments, the zeolite is exchanged with an element selected from Li, Na, K, Mg, Ca, Sr, or Ba.

At block 306, an absorbent is introduced (e.g., via injector 230) into the regeneration gas stream. In some embodiments, the absorbent is used to remove at least a portion of the C5+ hydrocarbons or organic sulfur species in the regeneration gas stream. In some embodiments, the absorbent is a liquid phase and comprises C7+ hydrocarbons (e.g., C7+ hydrocarbons removed from the regeneration gas stream). In some embodiments, the absorbent comprises one or more of polyethylene glycol, alkanes (e.g., of C8+ hydrocarbons), aromatics (e.g., of C7+ hydrocarbons), or other absorbents that would not build up substantially in the recycle loop. In some embodiments, after introducing the absorbent at block 306, the regeneration gas stream is cooled (e.g., by cooler 223) to less than 50° C.

At block 308, C5+ hydrocarbons or organic sulfur species are subsequently removed from the regeneration gas stream (e.g., via separator 224). In some embodiments, the C5+ hydrocarbons or organic sulfur species are removed utilizing three-phase separation to separate the absorbent and liquid water from the regeneration gas stream. In some embodiments, the absorbent comprises the portion of the C5+ hydrocarbons or organic sulfur species. In some embodiments, the process 300 further comprises flash evaporating the separated absorbent (e.g., via the heater 232 and separator 234) to remove the portion of the C5+ hydrocarbons or organic sulfur species contained in the absorbent. In some embodiments, the absorbent is subsequently re-introduced (via stream 209) into the regeneration gas stream.

At block 310, the regeneration gas stream (e.g., stream 206) is subsequently mixed with the gas feed stream 201 and reintroduced into the first adsorbent bed.

ILLUSTRATIVE EXAMPLES

The following examples based on simulations are set forth to assist in understanding the disclosure and should not, of course, be construed as specifically limiting the embodiments described and claimed herein. Such variations of the disclosed embodiments, including the substitution of all equivalents now known or later developed, which would be within the purview of those skilled in the art, and changes in formulation or minor changes in experimental design, are to be considered to fall within the scope of the embodiments incorporated herein.

Example 1

In describing this example, reference is made to system 200 of FIG. 2A with the objective being to reduce the level of mercaptans in the feed gas 212. The feed gas 212 as described by stream 201 in Table 1 is fed to adsorbent bed 220 which contains 20,000 kg of adsorbent. The adsorption step is run for 120 minutes, and after the adsorption step the adsorbent bed 221 is heated with a portion of the product gas yielding a stream with the average composition as described by stream 204 in Table 1 leaving the adsorbent bed 221 over the cycle. This stream is subsequently flashed at the average composition over the regeneration step at the pressure and temperature corresponding to the cooler (e.g., cooler 223). As can be seen in Table 1, the stream 208 leaving the separator 234 removes a majority of the methyl mercaptan, resulting in a lower buildup of methyl mercaptan in the feed to the adsorbent bed 220 as illustrated by the compositions in stream 202. This can accomplished by flashing the hydrocarbon liquids leaving the separator 224 and recycling the liquids stream 209 back to the inlet side of the cooler 223. The heavier mercaptan or hydrocarbons that are recycled back absorb lighter mercaptans, which lowers the concentration fed back to the adsorbent bed 220. In some embodiments, the separator 234 can be replaced with a distillation column.

TABLE 1

Example 1 with stream definitions referring to FIG. 2A

| | Stream No. | | | | | | | | | |
|---|---|---|---|---|---|---|---|---|---|---|
| | 201 | 202 | 203 | 204 | 205 | 206 | 207 | 208 | 209 | 211 |
| | | | | | Stream Description | | | | | |
| | Feed Gas | Total Feed To Adsorbent Bed | Treated gas from Adsorbent Bed | Regen Gas | Regen Gas mixed with Solvent | Recycle gas from Regen Separator | Water to disposal | HC gas to disposal | Solvent Recycle | Absorbent Purge |
| Properties | | | | | | | | | | |
| Molar Flow (lbmol/hr) | 49411.0 | 53226.3 | 53097.1 | 4195.5 | 4779.5 | 3815.3 | 93.3 | 279.6 | 584.0 | 6.6 |
| Temp. (° F.) | 118.4 | 118.4 | 118.4 | 86.0 | 86.5 | 86.5 | 86.5 | 100.0 | 74.8 | 74.8 |
| Pressure (psia) | 1116.8 | 1116.8 | 1116.8 | 1116.8 | 1116.0 | 1116.0 | 1116.0 | 40.0 | 1116.0 | 1116.0 |

TABLE 1-continued

Example 1 with stream definitions referring to FIG. 2A

| Stream No. | 201 | 202 | 203 | 204 | 205 | 206 | 207 | 208 | 209 | 211 |
|---|---|---|---|---|---|---|---|---|---|---|
| Stream Description | Feed Gas | Total Feed To Adsorbent Bed | Treated gas from Adsorbent Bed | Regen Gas | Regen Gas mixed with Solvent | Recycle gas from Regen Separator | Water to disposal | HC gas to disposal | Solvent Recycle | Absorbent Purge |
| Component (mole %) | | | | | | | | | | |
| $N_2$ | 0.3612 | 0.3623 | 0.3632 | 0.3517 | 0.3088 | 0.3769 | 0.0003 | 0.1342 | 0.0005 | 0.0005 |
| $CO_2$ | 0.0000 | 0.0002 | 0.0000 | 0.0028 | 0.0025 | 0.0027 | 0.0001 | 0.0055 | 0.0002 | 0.0002 |
| C1 | 96.4036 | 96.4128 | 96.6537 | 93.5974 | 82.2929 | 96.5321 | 0.0000 | 87.2198 | 1.0802 | 1.0802 |
| C2 | 2.7759 | 2.7485 | 2.7554 | 2.6682 | 2.4019 | 2.3940 | 0.0000 | 7.3877 | 0.4889 | 0.4889 |
| C3 | 0.1103 | 0.1081 | 0.1083 | 0.1049 | 0.1060 | 0.0796 | 0.0000 | 0.4972 | 0.1140 | 0.1140 |
| iC4 | 0.0201 | 0.0195 | 0.0196 | 0.0190 | 0.0244 | 0.0130 | 0.0000 | 0.1112 | 0.0632 | 0.0632 |
| nC4 | 0.0401 | 0.0390 | 0.0391 | 0.0379 | 0.0560 | 0.0252 | 0.0000 | 0.2355 | 0.1860 | 0.1860 |
| iC5 | 0.0098 | 0.0097 | 0.0094 | 0.0136 | 0.0319 | 0.0089 | 0.0000 | 0.0866 | 0.1637 | 0.1637 |
| nC5 | 0.0000 | 0.0000 | 0.0000 | 0.0000 | 0.0000 | 0.0000 | 0.0000 | 0.0000 | 0.0001 | 0.0001 |
| nC6 | 0.0050 | 0.0051 | 0.0047 | 0.0099 | 0.0593 | 0.0065 | 0.0000 | 0.0554 | 0.4145 | 0.4145 |
| nC7 | 0.0333 | 0.0362 | 0.0293 | 0.1161 | 1.4832 | 0.0735 | 0.0000 | 0.5037 | 11.3045 | 11.3045 |
| Benzene | 0.0249 | 0.0377 | 0.0113 | 0.3461 | 2.4059 | 0.2030 | 0.0000 | 2.0412 | 17.2036 | 17.2036 |
| nC8 | 0.0104 | 0.0148 | 0.0044 | 0.1364 | 3.2433 | 0.0724 | 0.0000 | 0.3907 | 25.5633 | 25.5633 |
| Toluene | 0.0000 | 0.0000 | 0.0000 | 0.0001 | 0.0021 | 0.0001 | 0.0000 | 0.0006 | 0.0165 | 0.0165 |
| nC9 | 0.0040 | 0.0053 | 0.0008 | 0.0585 | 2.1583 | 0.0224 | 0.0000 | 0.0947 | 17.2430 | 17.2430 |
| nC10 | 0.0034 | 0.0040 | 0.0000 | 0.0507 | 2.3745 | 0.0117 | 0.0000 | 0.0385 | 19.0687 | 19.0687 |
| nC11 | 0.0000 | 0.0000 | 0.0000 | 0.0001 | 0.0049 | 0.0000 | 0.0000 | 0.0000 | 0.0395 | 0.0395 |
| m-mercaptan | 0.0007 | 0.0011 | 0.0003 | 0.0103 | 0.0131 | 0.0066 | 0.0002 | 0.0647 | 0.0333 | 0.0333 |
| $H_2S$ | 0.0003 | 0.0003 | 0.0003 | 0.0003 | 0.0003 | 0.0002 | 0.0000 | 0.0010 | 0.0001 | 0.0001 |
| e-mercaptan | 0.0003 | 0.0005 | 0.0001 | 0.0058 | 0.0113 | 0.0035 | 0.0000 | 0.0388 | 0.0507 | 0.0507 |
| p-xylene | 0.0000 | 0.0000 | 0.0000 | 0.0000 | 0.0000 | 0.0000 | 0.0000 | 0.0000 | 0.0000 | 0.0000 |
| n-p-mercaptan | 0.0068 | 0.0129 | 0.0000 | 0.1640 | 0.9940 | 0.0923 | 0.0000 | 0.8979 | 6.9572 | 6.9572 |
| $H_2O$ | 0.1900 | 0.1818 | 0.0000 | 2.3060 | 2.0253 | 0.0752 | 99.9993 | 0.1950 | 0.0083 | 0.0083 |
| MeOH | 0.0000 | 0.0000 | 0.0000 | 0.0000 | 0.0000 | 0.0000 | 0.0000 | 0.0000 | 0.0000 | 0.0000 |

Example 2

In describing this example, reference is again made to system 200 of FIG. 2A with the objective being to reduce the level of n-heptane in the feed gas 212. The feed 212 as described by stream 201 in Table 2 is fed to an adsorbent bed 220 which contains 4,200 kg of adsorbent. The adsorption step is run for 170 minutes, and after the adsorption step the adsorbent bed 221 is heated with a portion of the product gas yielding a stream with the average composition as described by stream 204 in Table 2 leaving the adsorbent bed 221 over the cycle. This stream is subsequently flashed at the average composition over the regeneration step at the pressure and temperature corresponding to the cooler (e.g., cooler 223). As can be seen in Table 2, the gas leaving the separator 234 removes a majority of the n-heptane, resulting in a lower buildup of n-heptane in the feed to the adsorbent bed 220 as illustrated by the compositions in stream 202. This can be accomplished by flashing the hydrocarbon liquids leaving the separator 224 and recycling the liquids stream 209 back to the inlet side of the cooler 223. The heavier hydrocarbons that are recycled back absorb lighter n-heptane, which lowers the concentration fed back to the adsorbent bed 220. In some embodiments, the separator 234 can be replaced with a distillation column.

In addition, a separate small stream 210 of n-C10 can introduced in this case as the stream 201 does not contain heavy-ends. As can be seen in Table 2, the makeup of stream 210 is small compare to stream 209. There can also be a draw off stream 211 to allow for the removal of heavy hydrocarbons in the recycle loop which may or may not be required if the heavy-ends do not leave through the vapor in stream 208.

TABLE 2

Example 2 with stream definitions referring to FIG. 2A

| | Stream No. | | | | | | | | | | |
|---|---|---|---|---|---|---|---|---|---|---|---|
| | 201 | 202 | 203 | 204 | 205 | 206 | 207 | 208 | 209 | 210 | 211 |
| | Stream Description | | | | | | | | | | |
| | Feed Gas | Total Feed to Adsorbent Bed | Treated Gas From Adsorbent Bed | Regen Gas | Regen Gas mixed with Solvent | Recycle Gas from Regen Separator | Water to Disposal | HC Gas to Disposal | Solvent Recycle | Solvent Makeup | Absorbent Purge |
| Properties | | | | | | | | | | | |
| Molar Flow (lbmol/hr) | 1827 | 2143 | 2141 | 321 | 332 | 316 | 1.1 | 4.0 | 11.0 | 0.2 | 0.0 |
| Temp. (° F) | 68 | 68 | 68 | 68 | 71 | 68 | 68 | 220 | 71 | 68 | 68 |
| Pressure (psia) | 705 | 705 | 705 | 705 | 700 | 680 | 40 | 40 | 705 | 680 | 40 |
| Component (mole %) | | | | | | | | | | | |
| $N_2$ | 0.3612 | 0.3616 | 0.3619 | 0.3597 | 0.3475 | 0.3640 | 0.0002 | 0.1010 | 0.0005 | 0.0000 | 0.0005 |
| $CO_2$ | 0.0000 | 0.0003 | 0.0000 | 0.0020 | 0.0019 | 0.0018 | 0.0000 | 0.0037 | 0.0001 | 0.0000 | 0.0001 |
| Methane | 96.6018 | 96.6054 | 96.6958 | 96.0921 | 92.8602 | 96.6265 | 0.0000 | 76.2401 | 0.7976 | 0.0000 | 0.7985 |
| Ethane | 2.7759 | 2.7611 | 2.7637 | 2.7465 | 2.6632 | 2.6759 | 0.0000 | 8.9269 | 0.2971 | 0.0000 | 0.2966 |
| Propane | 0.1103 | 0.1085 | 0.1086 | 0.1079 | 0.1067 | 0.0983 | 0.0000 | 0.8931 | 0.0717 | 0.0000 | 0.0715 |
| iC4 | 0.0201 | 0.0195 | 0.0195 | 0.0194 | 0.0202 | 0.0161 | 0.0000 | 0.2806 | 0.0436 | 0.0000 | 0.0435 |
| nC4 | 0.0401 | 0.0387 | 0.0387 | 0.0385 | 0.0415 | 0.0305 | 0.0000 | 0.6723 | 0.1304 | 0.0000 | 0.1301 |
| iC5 | 0.0098 | 0.0106 | 0.0086 | 0.0219 | 0.0282 | 0.0152 | 0.0000 | 0.5584 | 0.2111 | 0.0000 | 0.2113 |
| nC5 | 0.0000 | 0.0000 | 0.0000 | 0.0000 | 0.0000 | 0.0000 | 0.0000 | 0.0003 | 0.0001 | 0.0000 | 0.0001 |
| nC6 | 0.0050 | 0.0065 | 0.0026 | 0.0285 | 0.0639 | 0.0150 | 0.0000 | 1.0789 | 1.0919 | 0.0000 | 1.0901 |
| nC7 | 0.0149 | 0.0216 | 0.0002 | 0.1432 | 0.5975 | 0.0604 | 0.0000 | 6.2377 | 13.8501 | 0.0000 | 13.6971 |
| Benzene | 0.0016 | 0.0025 | 0.0000 | 0.0170 | 0.0395 | 0.0083 | 0.0000 | 0.6667 | 0.6984 | 0.0000 | 0.6802 |
| nC8 | 0.0010 | 0.0013 | 0.0000 | 0.0086 | 0.0729 | 0.0029 | 0.0000 | 0.4031 | 1.9442 | 0.0000 | 1.9315 |
| nC9 | 0.0001 | 0.0001 | 0.0000 | 0.0008 | 0.0135 | 0.0002 | 0.0000 | 0.0373 | 0.3817 | 0.0000 | 0.3822 |
| nC10 | 0.0000 | 0.0027 | 0.0000 | 0.0178 | 2.7600 | 0.0181 | 0.0000 | 3.7565 | 80.4672 | 100.0000 | 80.6521 |
| nC11 | 0.0000 | 0.0000 | 0.0000 | 0.0000 | 0.0000 | 0.0000 | 0.0000 | 0.0000 | 0.0009 | 0.0000 | 0.0009 |
| $H_2S$ | 0.0003 | 0.0003 | 0.0003 | 0.0003 | 0.0003 | 0.0003 | 0.0000 | 0.0014 | 0.0001 | 0.0000 | 0.0001 |
| $H_2O$ | 0.0581 | 0.0593 | 0.0000 | 0.3959 | 0.3826 | 0.0664 | 99.9997 | 0.1372 | 0.0030 | 0.0000 | 0.0030 |

Comparative Example 1

Figure 4:
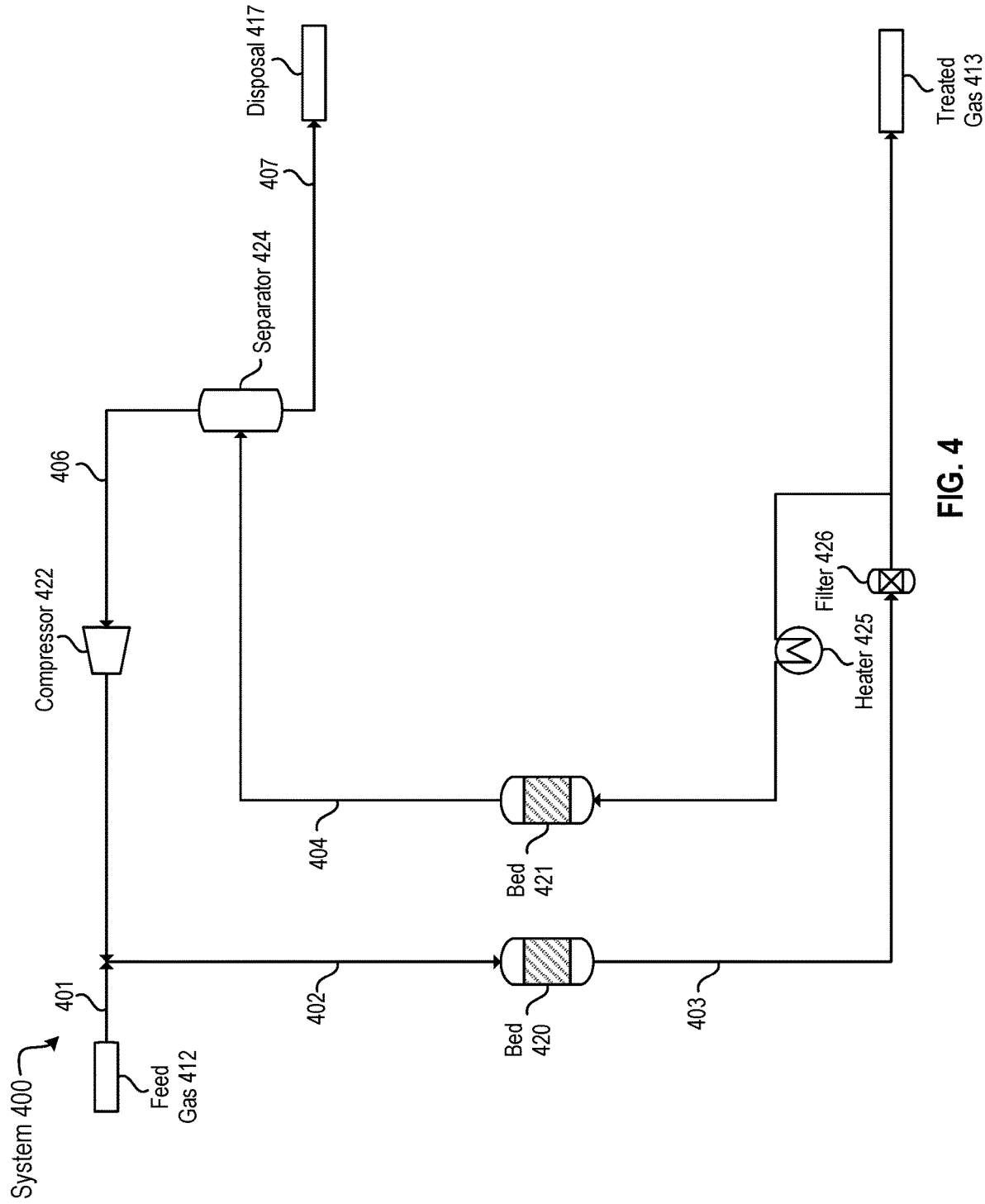
FIG. 4 illustrates a schematic of a system for hydrocarbon removal in accordance with a comparative example.

FIG. 4 illustrates a schematic of a system 400 for hydrocarbon removal in accordance with Comparative Examples 1 and 2. The system 400 includes a feed gas 212 source to direct a feed gas along a stream 401. A stream 402 is directed to an adsorbent bed 420, for example, during an adsorption cycle of a TSA process. In some embodiments, a gas composition of stream 402 corresponds to the gas composition of stream 401. In some embodiments, the gas composition of stream 402 corresponds to a mixture of stream 401 and stream 406, which is a regeneration gas stream. In some embodiments, a stream 403 leaving the adsorbent bed passes through a filter 426 (e.g., a dust filter) and is split into two paths: a first path to collect treated gas 413 and a second path that uses a portion of treated gas 413 as part of a regeneration loop. The second path may pass through a heater 425 to heat the treated gas to facilitate desorption in an adsorbent bed 421. A regeneration gas stream 404 leaving the adsorbent bed 421 is then directed along a stream 404 to a separator 424 to separate and remove heavy hydrocarbons 407 (e.g., via disposal 417). A separated regeneration gas stream 406 passes through a compressor 422 before being mixed with stream 401 and reintroduced into the adsorbent bed 420.

In describing this example, reference is made to system 400 of FIG. 4 with the objective being to reduce the level of mercaptans in the feed 412. The feed gas 412 as described by stream 401 in Table 3 is fed to the adsorbent bed 420 which contains 24,000 kg of adsorbent. The adsorption step is run for 120 minutes, and after the adsorption step the adsorbent bed 421 is heated with a portion of the product gas yielding a stream with the average composition as described by stream 404 in Table 3 leaving the adsorbent bed 421 over the cycle. This stream is subsequently flashed at the average composition over the regeneration step at the pressure and temperature corresponding to the cooler (e.g., cooler 223). As can be seen in Table 3, the stream 406 leaving the separator 224 does not remove methyl mercaptan to the same degree as Example 1 as evidenced by the increased buildup of methyl mercaptan in the feed to the adsorbent bed 420 as illustrated by the compositions in stream 402.

TABLE 3

Comparative Example 1 with stream definitions referring to FIG. 4

| | Stream No. | | | | | |
|---|---|---|---|---|---|---|
| | 401 | 402 | 403 | 404 | 406 | 407 |
| | | | Stream Description | | | |
| | Feed Gas | Total Feed to Adsorbent Bed | Treated Gas from Adsorbent Bed | Regen Gas from Adsorbent Bed in Regeneration | Recycle Gas from Regen Separator | HC Liquid & Water to Disposal |
| Properties | | | | | | |
| Molar Flow (lbmol/hr) | 49411 | 54196 | 54049 | 4908 | 4785 | 123 |
| Temp. (° F.) | 118 | 118 | 118 | 500 | 86 | 86 |
| Pressure (psia) | 1117 | 1117 | 1117 | 1117 | 1116 | 1116 |
| Component (mole %) | | | | | | |
| $N_2$ | 0.3612 | 0.3611 | 0.3621 | 0.3509 | 0.3597 | 0.0087 |
| $CO_2$ | 0.0000 | 0.0009 | 0.0000 | 0.0097 | 0.0096 | 0.0142 |
| Methane | 96.4036 | 96.3577 | 96.6281 | 93.6419 | 95.8840 | 6.2231 |
| Ethane | 2.7759 | 2.7732 | 2.7810 | 2.6951 | 2.7461 | 0.7071 |
| Propane | 0.1103 | 0.1101 | 0.1104 | 0.1070 | 0.1078 | 0.0724 |
| iC4 | 0.0201 | 0.0200 | 0.0200 | 0.0194 | 0.0192 | 0.0261 |
| nC4 | 0.0401 | 0.0399 | 0.0400 | 0.0388 | 0.0380 | 0.0696 |
| iC5 | 0.0098 | 0.0101 | 0.0097 | 0.0138 | 0.0130 | 0.0456 |
| nC5 | 0.0000 | 0.0000 | 0.0000 | 0.0000 | 0.0000 | 0.0000 |
| nC6 | 0.0050 | 0.0053 | 0.0048 | 0.0098 | 0.0080 | 0.0830 |
| nC7 | 0.0333 | 0.0365 | 0.0291 | 0.1115 | 0.0701 | 1.7274 |
| Benzene | 0.0249 | 0.0545 | 0.0107 | 0.4945 | 0.3604 | 5.7239 |
| nC8 | 0.0104 | 0.0144 | 0.0028 | 0.1307 | 0.0559 | 3.0503 |
| nC9 | 0.0040 | 0.0048 | 0.0002 | 0.0509 | 0.0132 | 1.5237 |
| nC10 | 0.0034 | 0.0036 | 0.0000 | 0.0399 | 0.0058 | 1.3685 |
| nC11 | 0.0000 | 0.0000 | 0.0000 | 0.0001 | 0.0000 | 0.0028 |
| m-mercaptan | 0.0007 | 0.0031 | 0.0006 | 0.0280 | 0.0277 | 0.0385 |
| e-mercaptan | 0.0003 | 0.0020 | 0.0001 | 0.0215 | 0.0199 | 0.0840 |
| n-p-mercaptan | 0.0068 | 0.0227 | 0.0000 | 0.2511 | 0.1874 | 2.7340 |
| $H_2O$ | 0.1900 | 0.1798 | 0.0000 | 1.9851 | 0.0742 | 76.4939 |

Comparative Example 2

In describing this example, reference is made to system 400 of FIG. 4 with the objective being to reduce the level of n-heptane in the feed 412. The feed gas 412 as described by stream 401 in Table 4 is fed to the adsorbent bed 420, which contains 4,200 kg of adsorbent. The adsorption step is run for 170 minutes, and after the adsorption step the adsorbent bed 421 is heated with a portion of the product gas yielding a stream with the average composition as described by stream 404 leaving the adsorbent bed 421 over the cycle. This stream is subsequently flashed at the average composition over the regeneration step at the pressure and temperature corresponding to the cooler (e.g., cooler 223). As can be seen in Table 4, the stream 406 leaving the separator 424 does not remove n-heptane to the same degree as Example 2 as evidenced by the increased buildup of n-heptane in the feed to the adsorbent bed 420 as illustrated by the compositions in stream 402.

TABLE 4

Comparative Example 2 with stream definitions referring to FIG. 4

| | Stream No. | | | | | |
|---|---|---|---|---|---|---|
| | 401 | 402 | 403 | 404 | 406 | 407 |
| | | | Stream Description | | | |
| | Feed Gas | Total Feed to Adsorbent Bed | Treated Gas from Adsorbent Bed | Regen Gas from Adsorbent Bed in Regeneration | Recycle Gas from Regen Separator | HC Liquid & Water to Disposal |
| Properties | | | | | | |
| Molar Flow (lbmol/hr) | 1827 | 2157 | 2154 | 331 | 330 | 1.48 |
| Temperature (° F.) | 68 | 68 | 68 | 68 | 68 | 68 |

TABLE 4-continued

Comparative Example 2 with stream definitions referring to FIG. 4

| | Stream No. | | | | | |
|---|---|---|---|---|---|---|
| | 401 | 402 | 403 | 404 | 406 | 407 |
| | Stream Description | | | | | |
| | Feed Gas | Total Feed to Adsorbent Bed | Treated Gas from Adsorbent Bed | Regen Gas from Adsorbent Bed in Regeneration | Recycle Gas from Regen Separator | HC Liquid & Water to Disposal |
| Pressure (psia) | 705 | 705 | 705 | 705 | 705 | 705 |
| Component (mole %) | | | | | | |
| $N_2$ | 0.3612 | 0.3610 | 0.3615 | 0.3583 | 0.3599 | 0.0075 |
| $CO_2$ | 0.0000 | 0.0005 | 0.0000 | 0.0031 | 0.0032 | 0.0006 |
| Methane | 96.6018 | 96.5463 | 96.6754 | 95.8349 | 96.2383 | 6.1462 |
| Ethane | 2.7759 | 2.7737 | 2.7775 | 2.7533 | 2.7620 | 0.8212 |
| Propane | 0.1103 | 0.1101 | 0.1103 | 0.1093 | 0.1094 | 0.0999 |
| iC4 | 0.0201 | 0.0200 | 0.0200 | 0.0199 | 0.0198 | 0.0405 |
| nC4 | 0.0401 | 0.0400 | 0.0400 | 0.0397 | 0.0393 | 0.1109 |
| iC5 | 0.0098 | 0.0116 | 0.0097 | 0.0219 | 0.0214 | 0.1328 |
| nC5 | 0.0000 | 0.0000 | 0.0000 | 0.0000 | 0.0000 | 0.0001 |
| nC6 | 0.0050 | 0.0093 | 0.0044 | 0.0362 | 0.0330 | 0.7384 |
| nC7 | 0.0149 | 0.0568 | 0.0009 | 0.3645 | 0.2883 | 17.3112 |
| Benzene | 0.0016 | 0.0101 | 0.0000 | 0.0660 | 0.0587 | 1.6918 |
| nC8 | 0.0010 | 0.0021 | 0.0000 | 0.0134 | 0.0079 | 1.2393 |
| nC9 | 0.0001 | 0.0001 | 0.0000 | 0.0008 | 0.0003 | 0.1178 |
| nC10 | 0.0000 | 0.0000 | 0.0000 | 0.0000 | 0.0000 | 0.0000 |
| nC11 | 0.0000 | 0.0000 | 0.0000 | 0.0000 | 0.0000 | 0.0000 |
| $H_2S$ | 0.0003 | 0.0003 | 0.0003 | 0.0003 | 0.0003 | 0.0001 |
| $H_2O$ | 0.0581 | 0.0581 | 0.0000 | 0.3781 | 0.0581 | 71.5292 |

In the foregoing description, numerous specific details are set forth, such as specific materials, dimensions, processes parameters, etc., to provide a thorough understanding of the embodiments of the present disclosure. The particular features, structures, materials, or characteristics may be combined in any suitable manner in one or more embodiments. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion.

As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form.

Reference throughout this specification to "an embodiment", "certain embodiments", or "one embodiment" means that a particular feature, structure, or characteristic described in connection with the embodiment is included in at least one embodiment. Thus, the appearances of the phrase "an embodiment", "certain embodiments", or "one embodiment" in various places throughout this specification are not necessarily all referring to the same embodiment, and such references mean "at least one".

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A process comprising:
   introducing a gas feed stream comprising C5+ hydrocarbons or organic sulfur species into a first adsorbent bed to produce a treated gas stream;
   regenerating a second adsorbent bed with a portion of the treated gas stream to produce a regeneration gas stream;
   introducing an absorbent into the regeneration gas stream to remove a portion of the C5+ hydrocarbons or organic sulfur species;
   subsequently removing the portion of the C5+ hydrocarbons or organic sulfur species from the regeneration gas stream to form a separated regeneration gas stream; and
   subsequently mixing the separated regeneration gas stream with the gas feed stream.

2. The process of claim 1, wherein the C5+ hydrocarbons or organic sulfur species comprise mercaptans.

3. The process of claim 1, further comprising cooling the regeneration gas stream to less than 50° C. after introducing the absorbent.

4. The process of claim 1, wherein the absorbent comprises C7+ hydrocarbons.

5. The process of claim 4, wherein the C7+ hydrocarbons correspond to C7+ hydrocarbons that were removed from the regeneration gas stream.

6. The process of claim 1, wherein the absorbent comprises one or more of polyethylene glycol, alkanes, or aromatics.

7. The process of claim 1, wherein subsequently removing the portion of the C5+ hydrocarbons or organic sulfur species comprises utilizing three-phase separation to separate the absorbent and liquid water from the regeneration gas stream, wherein the absorbent, when separated, comprises the portion of the C5+ hydrocarbons or organic sulfur species.

8. The process of claim 7, further comprising:
flash evaporating the absorbent, after being separated, to remove the portion of the C5+ hydrocarbons or organic sulfur species; and
subsequently re-introducing the absorbent into the regeneration gas stream.

9. The process of claim 1, wherein one or more of the first adsorbent bed or the second adsorbent bed comprises an amorphous silica adsorbent and/or an amorphous silica-alumina adsorbent, high-silica zeolite, zeolite X, zeolite 5A, or a combination thereof.

10. The process of claim 1, wherein one or more of the first adsorbent bed or the second adsorbent bed comprises a zeolite comprising zeolite 3A, zeolite 4A, zeolite 5A, or zeolite 13X, or a combination thereof.

11. The process of claim 10, wherein the zeolite is exchanged with an element selected from Li, Na, K, Mg, Ca, Sr, or Ba.

\* \* \* \* \*